United States Patent [19]
Tanaka et al.

[11] 4,438,240
[45] Mar. 20, 1984

[54] POLYAMIDE ELASTOMER

[75] Inventors: Chiaki Tanaka, Chita; Shinobu Nakashima, Nagoya; Makoto Kondow, Konan, all of Japan

[73] Assignee: Toray Industries, Incorporated, Tokyo, Japan

[21] Appl. No.: 497,864

[22] Filed: May 25, 1983

[30] Foreign Application Priority Data

May 27, 1982 [JP] Japan ................... 57-90212

[51] Int. Cl.$^3$ ............... C08F 283/04; C08G 69/48; C08L 77/00
[52] U.S. Cl. ........................... 525/420; 525/437; 528/288; 528/292; 528/301; 528/302
[58] Field of Search ............... 525/420, 437; 528/288, 528/292, 301, 302

[56] References Cited

U.S. PATENT DOCUMENTS

| | | | |
|---|---|---|---|
| 3,946,089 | 3/1976 | Furukawa et al. | 525/420 X |
| 4,053,441 | 10/1977 | Wagener et al. | 525/437 X |
| 4,081,428 | 3/1978 | Thompson | 525/437 |
| 4,145,372 | 3/1979 | Murray et al. | 525/437 X |
| 4,208,493 | 6/1980 | Deleens et al. | 528/301 X |
| 4,328,331 | 5/1982 | Chen et al. | 528/288 |
| 4,361,680 | 11/1982 | Borg et al. | 525/420 |
| 4,376,856 | 3/1983 | Tanaka et al. | 525/420 X |

*Primary Examiner*—Lucille M. Phynes
*Attorney, Agent, or Firm*—Stevens, Davis, Miller & Mosher

[57] ABSTRACT

Provided is a polyether-ester-amide consisting essentially of about 5 to 50 weight percent of polaymide segment (A) and about 95 to 50 weight percent of polyether ester segment (B), and having a melting point not lower than 160° C., a Shore hardness in the range of 80A to 45D, a tensile modulus in the range of 100 to 1,000 kg/cm$^2$ and an elastic recovery at 50% elongation of not less than 70%, said polyamide segment (A) having been obtained from:

a $C_6$–$C_{20}$ aliphatic diamine (A-1); and at least one dicarboxylic acid (A-2) selected from the group consisting of $C_6$–$C_{15}$ aliphatic dicarboxylic acids, terephthalic acid and hexahydroterephthalic acid, provided the total number of carbon atoms of said diamine and said dicarboxylic acid is not less than 16, said polyether ester segment (B) having been obtained from:

a poly(alkylene oxide) glycol (B-1) having a ratio of carbon atom number to oxygen atom number of not smaller than 2.3 and having a number average molecular weight in the range of 300 to 5,000; and a $C_4$–$C_{20}$ dicarboxylic acid (B-2).

20 Claims, No Drawings

POLYAMIDE ELASTOMER

BACKGROUND OF THE INVENTION

The present invention relates to a polyamide elastomer consisting essentially of a segmented polyether-ester-amide and more particularly to a polyamide elastomer which exhibits superior rubber elasticity, mechanical strength and moldability over a wide temperature range from low to high temperature.

Polyether-ester-amide block copolymers are known that they are thermoplastic elastomers having superior impact resistance and rubber elasticity like polyether esters and polyether amides. For example, a polyether-ester-amide comprising polydodecaneamide (nylon 12) as hard segment and poly(tetramethylene oxide) glycol as polyether component is presently available commercially. This block copolymer is superior in flexibility and impact resistance at low temperatures, but its high-temperature characteristics and oil- and chemicals-resistance are not satisfactory. Especially at a high temperature region not lower than 100° C., a conspicuous deterioration is observed with respect to elastic modulus and strength, and at temperatures not lower than 120° C. it is substantially impossible to use such commercially available polyether-ester-amide.

In an attempt to improve high-temperature characteristics of polyether-ester-amide there has been proposed one which employs polycapramide (nylon 6) as hard segment. But the affinity of nylon 6 for such a polyether as poly(tetramethylene oxide) glycol is low and so its copolymerizable composition range is limited; besides, it is necessary that the caprolactam should be distilled out of the reaction system during melt polymerization, thus it being difficult to produce on an industrial scale a polyether-ester-amide of a desired composition and of a high polymerization degree. Under the circumstances, with such polyether-ester-amide using nylon 6 as hard segment, an elastomer superior in both flexibility and high-temperature characteristics has not been obtained yet. In the case of a soft type polyether-ester-amide using nylon 6 as hard segment and containing a larger amount of polyether component, the deterioration of crystallinity is conspicuous and also from this point it is difficult to attain both high-temperature characteristics and flexibility.

There has been proposed a process for preparing a polyether-ester-amide by reacting a dicarboxylic polyamide (nylon 6-12 component), obtained from hexamethylenediamine-dodecanoate and adipic acid, with poly-tetramethylene glycol (U.S. Pat. No. 4,230,838).

However, most of the polyether-ester-amides concretely disclosed therein using as hard segment polyamide in which the total number of carbon atoms of diamine and dicarboxylic acid is not less than 16 have melting points lower than 160° C. Even a polyether-ester-amide having a melting point higher than 160° C., the elastic recovery is low and the tensile strength at elevated temperatures, for instance, 120° C. or more is lower than 50 kg/cm². Therefore, they are unsuitable for use in automobile hose or the like.

SUMMARY OF THE INVENTION

It is an object of the present invention to eliminate the aforementioned disadvantages of conventional polyamide elastomers.

It is another object of the present invention to provide a thermoplastic elastomer which retains superior flexibility and impact resistance at low temperatures as well as a superior moldability and which further exhibits a high mechanical strength and rubbery properties even at a high temperature region of 100° to 150° C.

According to the present invention there is provided a polyether-ester-amide consisting essentially of about 5 to 50% by weight of polyamide segment (A) and about 95 to 50% by weight of polyether ester segment (B), and having a melting point not lower than 160° C., a Shore hardness ranging from 80A to 45D, a tensile modulus of elasticity ranging from 100 to 1,000 kg/cm² and an elastic recovery at 50% elongation of not less than 70%, the polyamide segment (A) having been obtained from a $C_6$ to $C_{20}$ aliphatic diamine (A-1) and at least one dicarboxylic acid (A-2) selected from the group consisting of $C_6$ to $C_{15}$ aliphatic dicarboxylic acids, terephthalic acid and hexahydroterephthalic acid provided the total of carbon atoms of the diamine and the dicarboxylic acid is not less than 16, and the polyether ester segment (B) having been obtained from a poly(alkylene oxide) glycol (B-1) and a $C_4$ to $C_{20}$ dicarboxylic acid (B-2), the poly(alkylene oxide) glycol (B-1) having a ratio of carbon atom number to oxygen atom number of not less than 2.3 and a number average molecular weight in the range of 300 to 5,000.

The above polyether-ester-amide is obtained by a process for preparing a polyether-ester-amide consisting essentially of about 5 to 50 weight percent of polyamide segment (A) and about 95 to 50 weight percent of polyether ester segment (B), which process comprises the steps of:

charging into a vessel capable of being heated both a substantially equimolar amount of at least one $C_6$–$C_{20}$ aliphatic diamine (A-1) and at least one dicarboxylic acid (A-2) selected from the group consisting of $C_6$–$C_{15}$ aliphatic dicarboxylic acids, terephthalic acid and hexahydroterephthalic acid, or a salt formed from said aliphatic diamine (A-1) and said dicarboxylic acid (A-2), and a substantially equimolar amount of a poly(alkylene oxide) glycol (B-1) and at least one $C_4$–$C_{20}$ dicarboxylic acid (B-2), said poly(alkylene oxide) glycol (B-1) having a ratio of carbon atom number to oxygen atom number of not less than 2.3 and having a number average molecular weight in the range of 300 to 50,000, followed by heating for homogenization at a temperature in the range of 150° C. to 260° C. under stirring; and heating the homogenized reaction mixture at a temperature in the range of 220° to 300° C. under a high vacuum not greater than 15 mmHg for polycondensation into said polyether-ester-amide. In this process, when dicarboxylic acid (A-2) of terephthalic acid is used as dicarboxylic acid (B-2) the objects of the present invention can be attained more effectively.

DESCRIPTION OF PREFERRED EMBODIMENTS

In the polyether-ester-amide of the present invention, the polyamide hard segment is obtained from a $C_6$ to $C_{20}$ aliphatic diamine (A-1) and at least one dicarboxylic acid (A-2) selected from $C_6$ to $C_{15}$ aliphatic dicarboxylic acids, terephthalic acid and hexahydroterephthalic acid, provided the total number of carbon atoms of the diamine and the dicarboxylic acid is not less than 16. More particularly, the following polyamide units are preferred:

(1) polyamide unit consisting mainly of undecamethylenediamine or dodecamethylenediamine and terephthalic acid, cyclohexane-1,4-dicarboxylic acid, or a derivative thereof;

(2) polyamide unit consisting mainly of polyhexamethylene sebacamide (nylon 610) or polyhexamethylene dodecaneamide (nylon 612) which nylons are prepared from hexamethylenediamine and sebacic acid, dodecanedioic acid, or a derivative thereof; and (3) polyamide unit consisting mainly of undecamethylenediamine or dodecamethylenediamine and a $C_6$ to $C_{10}$ aliphatic dicarboxylic acid such as, for example, adipic acid, pimelic acid, suberic acid, azelaic acid or sebacic acid.

It goes without saying that a small amount of a copolymerizable component may be contained in such polyamide hard segment within the limits of not preventing the objects of the present invention. Examples of copolymerizable component in the above polyamide unit (1) include aliphatic diamine units such as hexamethylenediamine, heptamethylenediamine, octamethylenediamine and decamethylenediamine, and dicarboxylic acid units such as adipic acid, azelaic acid, sebacic acid, undecanedioic acid, dodecanedioic acid and isophthalic acid. Examples of copolymerizable component in the above polyamide unit (2) include diamine units such as heptamethylenediamine, octamethylenediamine, decamethylenediamine, undecamethylenediamine, bis(p-aminocyclohexyl)methane and xylylenediamine, and dicarboxylic acid units such as adipic acid, azelaic acid, isophthalic acid, terephthalic acid and cyclohexane-1,4-dicarboxylic acid. Further, examples of copolymerizable component in the above polyamide unit (3) include dicarboxylic acid units such as terephthalic acid, isophthalic acid, cyclohexane-1,4-dicarboxylic acid, 5-sodium sulfoisophthalic acid, dimer acid and dodecadionic acid, and diamine units such as hexamethylenediamine, octamethylenediamine, decamethylenediamine, bis(p-aminocyclohexyl)methane and xylylenediamine.

In the polyether-ester-amide of the present invention, as one constituent of the polyether ester soft segment, there is used a poly(alkylene oxide) glycol having a ratio of carbon atom number to oxygen atom number of not less than 2.3 and a number average molecular weight in the range of 300 to 5,000.

The number average molecular weight of poly(alkylene oxide) glycols may range from 300 to 5,000, but an optimum molecular weight region is selected so as to give superior high- and low-temperature characteristics and mechanical properties without causing a gross phase separation during polymerization. Such optimum molecular weight region differs according to the kind of poly(alkylene oxide) glycol. The preferable number average molecular weight of poly(alkylene oxide) glycols ranges from from 500 to 3,000, especially preferably from 500 to 2,500. The higher the molecular weight, the higher the melting point of the resultant polymer. As poly(alkylene oxide) glycols having a ratio of carbon atom number to oxygen atom number of not less than 2.3 are exemplified poly(1,2- and 1,3-propylene oxide) glycols, poly(tetramethylene oxide) glycol, poly(hexamethylene oxide) glycol, block or random copolymer of ethylene oxide and propylene oxide, and block or random copolymer of ethylene oxide and tetrahydrofuran. Especially, poly(tetramethylene oxide) glycol is preferred in view of superior physical properties of the polyether-ester-amide such as superior thermal stability, water resistance, mechanical strength and elastic recovery.

As the other constituent of the polyether ester soft segment in the polyether-ester-amide of the present invention a dicarboxylic acid having 4 to 20 carbon atoms is used. Examples of such dicarboxylic acid include aliphatic dicarboxylic acids such as succinic acid, glutaric acid, adipic acid, azelaic acid, sebacic acid, dodecanedioic acid and dimer acid, aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid and 5-sodium sulfoisophthalic acid; and alicyclic dicarboxylic acids such as 1,4-cyclohexanedicarboxylic acid, 1,2-cyclohexanedicarboxylic acid and dicyclohexyl-4,4'-dicarboxylic acid. In order to obtain a polyether-ester-amides having the following physical properties industrially effectively, it is preferable that there be used the same dicarboxylic acid as that used as a constituent of the polyamide hard segment. Therefore, aliphatic dicarboxylic acids such as adipic acid, azelaic acid, sebacic acid and dodecanedioic acid are preferably used.

The polyether-ester-amides of the present invention must have the following physical properties. It is necessary for that that the polyamide unit and the polyether ester unit be copolymerized at a ratio by weight of (5-50)/(95-50) and so that the resultant copolymer has the following values of physical properties:

|  |  | Measuring Method |
|---|---|---|
| Melting point | not lower than 160° C. | ASTM D-3418 |
| Shore hardness | 45D-80A | ASTM D-2240 |
| Tensile modulus | 1,000–100 kg/cm$^2$ | ASTM D-638 |
| Elastic recovery (at 50% elongation) | not less than 70% | JIS K-6301 |

Particularly, it is preferable that the polyether ester soft segment be copolymerized in the range of 55 to 80% by weight based on the total weight of polyether-ester-amide. Ratios of the polyether ester component exceeding 95% are not desirable because the length of the polyamide hard segment in the resulting polyether-ester-amide would become too small, leading to deterioration in physical properties of the copolymer. This copolymer not only is flexible and superior in rubber elasticity at room temperature and thereabout, but also exhibits superior physical properties and moldability as elastomer over a wide temperature range from low to high temperatures.

Among the foregoing items of physical properties of the copolymer, it is the item of melting point that is most important in defining high-temperature characteristics mainly aimed at by the present invention. Tough the high-temperature properties depend not only on the melting point but also on the degree of crystallinity, the form of crystal and the perfectness of crystal, but generally the copolymer should be designed so as to exhibit a melting point not lower than 160° C., preferably not lower than 180° C.

Although the process for preparing the polyether-ester-amide of the present invention is not specially limited, a particularly superior process comprises the step of charging into a vessel capable of being heated a substantially equimolar amount of at least one $C_6$–$C_{20}$ aliphatic diamine (A-1) and a $C_6$–$C_{15}$ aliphatic dicarboxylic acid, terephthalic acid and/or hexahydroterephcentration in orthochlorophenol, and its melting point (Tm) and crystallization temperature (Tc) according to DSC proved to be 205° C. and 168° C., respectively. (Also in the following Examples and Comparative Examples the values of ηr, Tm and Tc will be determined in this way.)

The polymer was compression molded into sheets. The resultant article proved to have such mechanical properties as shown in Table 1 below. It was flexible and had rubber elasticity.

TABLE 1

| Item of Measurement | Measuring Method | Unit | Value |
|---|---|---|---|
| Tensile modulus | ASTM D-638 | kg/cm$^2$ | 950 |
| 10% modulus | " | " | 66 |
| 100% modulus | " | " | 105 |
| Tensile strength | " | " | 420 |
| Elongation at break | " | % | 700 |
| Shore D hardness | ASTM D-2240 | Shore D | 43 |
| Elastic recovery (at 50% elongation) | ASTM D-412 | % | 88 |

EXAMPLE 2

Polymerization was carried out under the same conditions as in Example 1 except that 42.55 parts of nylon 6.10 salt prepared from hexamethylenediamine and sebacic acid, 48.23 parts of poly(tetramethylene oxide) glycol having a number average molecular weight of 680 and 14.33 parts of sebacic acid were used as starting materials. An agitation torque of 5 kg.cm/22 rpm was reached in the polymerization time of 6 hours. The resultant polyether-ester-amide (II) was translucent in molten state, and main physical properties thereof were as follows:

θr: 1.76
Tm: 208° C.
Tc: 163° C.
Tensile modulus: 1,020 kg/cm$^2$
Shore D hardness: 45 D

EXAMPLE 3

Using as starting materials 26.45 parts of nylon 12.6 salt prepared from dodecamethylenediamine and adipic acid, 64.56 parts of poly(tetramethylene oxide) glycol having a number average molecular weight of 650 and 13.86 parts of adipic acid, heating was performed at 240° C. under stirring in the same way as in Example 1 to give a homogeneous, transparent solution. Thereafter, polymerization was allowed to take place at 270° C. for 8 hours to obtain a polyether-ester-amide (III) as a transparent, viscous polymer, properties of which were as follows:

ηr: 1.95
Tm: 162° C.
Tensile modulus: 170 kg/cm$^2$
10% modulus: 18 kg/cm$^2$
Tensile strength: 205 kg/cm$^2$
Elongation at break: 900 kg/cm$^2$
Hardness: 88A
Elastic recovery: 93%

EXAMPLE 4

25.806 parts of dodecamethylenediamine, 29.928 parts of adipic acid and 51.646 parts of poly(tetramethylene oxide) glycol having a number average molecular weight of 650 were charged into a polymerization tube, followed by heating at 200° C. for 45 minutes under stirring, to give a completely transparent, homogeneous solution. Subsequently, polymerization was allowed to take place under a high vacuum of 0.3 mmHg at 255° C. for 2 hours and further at 275° C. for 2 hours to afford a polyether-ester-amide (V) as a transparent, viscous, molten polymer, which proved to have the following properties:

ηr: 1.80
Tm: 211° C.
Tc: 173° C.
Tensile modulus: 930 kg/cm$^2$
Tensile strength: 380 kg/cm$^2$
Elongation at break: 650%

EXAMPLE 5

Using as starting materials nylon 11.6 salt, poly(tetramethylene oxide) glycol having a number average molecular weight of 1,000 and adipic acid, there was prepared a polyether-ester-amide (VI) consisting of 50 wt.% of nylon 11.6 units and 50 wt.% of polyether ester units. This polymer (VI) proved to have the following properties:

ηr: 1.62
Tm: 220° C.
Tc: 181° C.
Tensile modulus: 2,100 kg/cm$^2$
Elastic recovery: 79%

EXAMPLE 6

33.4 parts of undecamethylenediamineterephthalate (nylon 11.T salt) prepared from undecamethylenediamine and terephthalic acid, 58.3 parts of poly(tetramethylene oxide) glycol having a number average molecular weight of 650 and 14.9 parts of terephthalic acid were charged, together with 0.20 part of N,N'-hexamethylene-bis(3,5-di-t-butyl-hydroxyhydrocinnamide) (antioxidant; trade name "Irganox" 1098) and 0.05 part of a tetrabutyl titanate catalyst, into a reaction vessel equipped with a helical ribbon agitation blade, which was then purged with nitrogen gas. After subsequent heating at 240° C. for 40 minutes under stirring to obtain a homogeneous solution, there were created polymerization conditions of 280° C. and 0.5 mmHg according to a heat-up and pressure-reducing program, under which conditions a polymerization reaction was allowed to take place for 3.5 hours to give a colorless, translucent, viscous, molten polymer exhibiting an agitation torque of 50 kg.cm at 22 rpm. The polymer was discharged in the form of strand into water to obtain a flexible, non-sticky strand. The r and Tm of the polyether-ester-amide (VI) thus obtained were 1.84° and 230° C., respectively.

The polymer was compression-molded. The resultant article proved to have such mechanical properties as shown in Table 2. It was flexible and had rubber elasticity and exhibited a high mechanical strength even at high temperatures.

COMPARATIVE EXAMPLE 1

Using as starting materials 38.2 parts of aminododecanoic acid, 54.2 parts of poly(tetramethylene oxide) glycol and 13.9 parts of terephthalic acid, a polyether-ester-amine (VI') was prepared under the same polymerization conditions as in Example 6. The ηr and Tm of this polyether-ester-amide were 1.81° and 138° C., respectively. As shown in Table 2 below, in the temperature region from low to normal temperature, the polymer exhibited superior mechanical properties like the polymer prepared in Example 6, but at higher temperature its elastic modulus and strength deteriorated to a thalic acid (A-2), or a salt formed from (A-1) and (A-2), and a substantially equimolar amount of a poly(alkylene oxide) glycol (B-1) having a ratio of carbon atom number to oxygen atom number of not less than 2.3 and a number average molecular weight in the range of 300 to 5,000 and one or more $C_4$–$C_{20}$ dicarboxylic acids (B-2), and applying heat at 150°–260° C. under stirring to allow homogenization to take place, and the step of heating the homogenized reaction mixture at 220°–300° C. under a high vacuum of not more than 15 mmHg, preferably not more than 5 mmHg and more preferably not more than 1 mmHg to allow polycondensation to take place to obtain a copolymer consisting essentially of about 5 to 50% by weight of polyamide segment and about 95 to 50% by weight of polyether ester segment. The term "homogeneous" as referred to herein does not always mean a commingled state on a molecular order, but includes a state free from phase separation or the like as a whole even in a whitely turbid state in appearance. According to the above process, the polyether-ester-amide block copolymer of the present invention can be prepared industrially advantageously as a colorless polymer having a high degree of polymerization.

In the above process, preferably, aliphatic diamine (A-1) and dicarboxylic acid (A-2) are selected so as to satisfy that the total number of carbons thereof being 16 or more. The most typical combinations include a combination of hexamethylenediamine and sebacic acid and/or dodecanedioic acid, a combination of undecamethylene diamine and/or dodecamethylene diamine and at least one carboxylic acid selected from adipic acid, pimeric acid, suberic acid, azelaic acid, sebacic acid, terephthalic acid and hexahydroterephthalic acid. The upper limit of the total carbon number can be determined according to whether the melting point of the polymer obtained is over 160° or not. But the polyamide-forming components may be fed directly to the aforementioned reaction system without being formed into salt beforehand, and, in this case it is necessary to control the reaction conditions in the dissolving and homogenizing step so as to prevent the amine from being distilled out of the reaction system. There also may be adopted a method in which a dicarboxylic acid-terminated polyamide prepolymer is formed in advance from the amine-forming and dicarboxylic acid components and a poly(alkylene oxide) glycol is reacted therewith. But in this case, it is essential that the dicarboxylic acid as a constituent of the polyether ester unit be either identical with the dicarboxylic acid as a constituent of the polyamide unit, or terephthalic acid. Otherwise, the polyamide hard segment will be random-cpolymerized, thus making it impossible to obtain a soft elastomer superior in high-temperature characteristics aimed at in the present invention.

Preferable examples of catalyst which may be used in the polymerization reaction for preparing the polyether-ester-amide of the invention include titanium type catalysts such as tetraalkyl titanates, e.g. tetrabutyl titanate, and titanium oxalate metallic salts, e.g. potassium titanium oxalate; tin type catalysts such as dibutyltin oxide, dibutyltin laurate and monobutyltin oxide; zirconium tetraalkoxide type catalysts such as zirconium tetrabutoxide and zirconium isopropoxide; hafnium tetraalkoxide type catalysts such as hafnium tetraethoxide; and lead type catalysts such as lead acetate. These compounds as polymerization cataysts accelerate the reaction and are useful in easily preparing the colorless copolymer of the invention having superior physical properties and a high degree of polymerization. There also may be incorporated polyfunctional compounds such as trimesic acid, glycerin and pentaerythritol provided there should not occur gelation.

The polymerization degree of the polyether-ester-amide of the present invention, which differs according to the use, purpose and the molding method, should be not less than 1.5, preferably not less than 1.7, in terms of a relative viscosity ($\eta r$) in solution determined under the conditions of 0.5% concentration and 25° C. in orthochlorophenol.

In the polyether-ester-amide block copolymer of the present invention there may be incorporated heat- and light-resisting stabilizers such as an anti-oxidant, a thermal decomposition inhibitor and an ultraviolet ray absorber, during polymerization or before molding after polymerization. Examples of heat-resisting stabilizers include various hindered phenols such as 4,4'-bis(2,6-di-tert-butylphenol), 1,3,5-trimethyl-2,4,6-tris(3,5-di-tert-butyl-4-hydroxybenzyl)benzene, tetrakis[methylene-3(3,5-di-tert-butyl-4-hydroxyphenyl)propionate]methane and N,N'-hexamethylene-bis(3,5-di-tert-butyl-4-hydroxyhydrocinnamamide); aromatic amines such as N,N'-bis($\beta$-naphthyl)-p-phenylenediamine and 4,4'-bis(4-$\alpha$,$\alpha$-dimethylbenzyl)diphenylamine; sulfur compounds, e.g. dilaurylthiodipropionate, and phosphorus compounds, as well as alkaline earth metal oxides, nickel salts of Schiff bases, cuprous iodide and/or potassium iodide. As examples of light sstabilizers, mention may be made of substituted benzophenones, benzotriazoles, and piperidine compounds such as bis(2,2,6,6-tetramethyl-4-piperidine)sebacate and 4-benzoyloxy-2,2,6,6-tetramethylpiperidine.

Furthermore, the polyether-ester-amide block copolymer of the present invention may contain a hydrolystic stabilizer, a coloring agent (e.g. pigment or dye), an antistatic agent, a conducting agent, a flame retardant, a reinforcing material, a filler, a lubricant, a nucleating agent, a releasing agent, a plasticizer, an adhesive aid, a tackifier, etc.

The following examples are given to further illustrate the invention, in which the parts represent parts by weight unless otherwise specified.

EXAMPLE 1

42.32 parts of nylon 6.12 salt (dry product) prepared from hexamethylenediamine and dodecanedioic acid, 46.68 parts of poly(tetramethylene oxide) glycol having a number average molecular weight of 680 and 15.79 parts of dodecanedioic acid were charged, together with 0.20 part of "Irganox" 1098 (antioxidant: N,N'-hexamethylene bis(3,5-di-t-butylhydroxyhydrocinnamide)) and 0.05 part of a tetrabutyl titanate catalyst, into a reaction vessel equipped with a helical ribbon agitation blade, which was then purged with nitrogen gas. After subsequent heating at 240° C. for 40 minutes under stirring to obtain a substantially transparent, homogeneous solution, there were created polymerization conditions of 270° C. and 0.5 mmHg according to a heat-up and pressure-reducing program, under which conditions a polymerization reaction was allowed to take place for 4.5 hours to give a viscous, colorless, transparent, molten polymer exhibiting an agitation torque of 5.0 kg.cm at 22 rpm. The polymer was discharged in the form of strand into water to obtain a flexible, transparent and non-sticky strand. The polyether-ester-amide (I) thus obtained had a relative viscosity ($\eta r$) of 1.72 determined at 25° C., 0.5% conlarge extent, and at 120° C. the polymer almost flowed.

TABLE 2

| Item of Measurement | Measuring Method | Unit | Example 8 | Comparative Example 1 |
|---|---|---|---|---|
| 23° C. | | | | |
| Shore D hardness | ASTM D-2240 | Shore D | 37 | 39 |
| Tensile modulus | ASTM D-638 | kg/cm² | 320 | 420 |
| 10% modulus | " | " | 26 | 32 |
| Tensile strength | " | " | 320 | 340 |
| Elongation at break | " | % | 820 | 950 |
| Elastic recovery (at 50% elongation) | JIS K-6301 | " | 82 | 82 |
| −30° C. | | | | |
| Tensile modulus | ASTM D-638 | kg/cm² | 2,800 | 3,100 |
| 10% modulus | " | " | 230 | 250 |
| 80° C. | | | | |
| Tensile modulus | ASTM D-638 | kg/cm² | 320 | 150 |
| Tensile strength | " | " | 190 | 76 |
| Elongation at break | " | % | 700 | 800 |
| 120° C. | | | | |
| Tensile modulus | ASTM D-638 | kg/cm² | 130 | Unmeasurable (flowed) |
| Tensile strength | " | " | 110 | Unmeasurable (flowed) |
| Elongation at break | " | % | 900 | Unmeasurable (flowed) |

EXAMPLE 7

Using as starting materials 44.6 parts of undecamethylenediamine-terephthalate, 50.0 parts of poly(tetramethylene oxide) glycol having a number average molecular weight of 650 and 12.8 parts of terephthalic acid, there was prepared a polyether-ester-amide (VII) in the same way as in Example 6, whose physical properties were as follows:

| | |
|---|---|
| ηr | 1.79 |
| Tm (°C.) | 241 |
| Shore D hardness | 43 |
| Tensile modulus (kg/cm³) | |
| −30° C. | 3,900 |
| 23° C. | 710 |
| 120° C. | 380 |
| 150° C. | 200 |
| Tensile strength (kg/cm²) | |
| 23° C. | 360 |
| 120° C. | 170 |
| 150° C. | 85 |
| Elongation at break (%) | |
| 23° C. | 650 |
| 120° C. | 770 |
| 150° C. | 700 |

EXAMPLE 8

Using as starting materials 27.3 parts of undecamethylenediamine-terephthalate, 68.6 parts of poly(tetramethylene oxide) glycol having a number average molecular weight of 1,400 and 8.14 parts of terephthalic acid, there was prepared a polyether-ester-amide (VIII) in the same way as in Example 6. This product, which was translucent and extremely flexible, proved to have such physical properties as shown in Table 3.

COMPARATIVE EXAMPLE 2

Polymerization was carried out under the same conditions as in Example 8 except that the poly(tetramethylene oxide) glycol used was of a number average molecular weight of 6,000, to afford a polyether-ester-amide (VIII), which was milky like pearl during melt polymerization and inferior in physical properties (see Table 3).

TABLE 3

| | Polyether-ester-amide | |
|---|---|---|
| Item of Measurement | (VIII) Present Invention | (VIII) Comparative Example |
| ηr | 1.95 | 1.87 |
| Tm | 192 | 212 |
| Shore D hardness | 31 | 29 |
| Elastic recovery (at 50% elongation) | 88 | 60 |
| Tensile modulus (kg/cm²) | | |
| −30° C. | 1,700 | 3,400 |
| 23° C. | 190 | 190 |
| 80° C. | 140 | 25 |
| 120° C. | 75 | Unmeasurable |
| Tensile strength (kg/cm²) | | |
| 23° C. | 260 | 180 |
| 80° C. | 160 | Unmeasurable |
| 120° C. | 85 | " |
| Elongation at break (%) | | |
| 23° C. | 1,050 | 800 |
| 80° C. | 1,000 | Unmeasurable |
| 120° C. | 830 | " |

EXAMPLE 9

17.5 parts of undecamethylenediamine and 30.8 parts of terephthalic acid were charged into a reaction vessel and heated with stirring at 160°–230° C. for 1 hour under a nitrogen gas stream. Then, 58.3 parts of poly(tetramethylene oxide) glycol hving a number average molecular weight of 650, 020 part of "Irganox" 1098 and 0.05 part of tetrabutyl titanate were added into the reaction mixture, and polymerization was allowed to take place according to the same heat-up and pressure-reducing program as in Example 6. After 5 hours and 20 minutes, a target torque of 5.0 kg.cm/22 rpm was reached. The ηr and Tm of the resultant polyether-ester-amide (IX) were 1.85° and 228° C., respectively. Not only in mechanical properties but also in physical properties this product was almost equal to the polyether-ester-amide (VI) prepared in Example 6.

EXAMPLE 10

Polymerization was conducted in the same way as in Example 6 using as starting materials 33.4 parts of undecamethylenediamine-terephthalate, 65.9 parts of polyether glycol from copolymerization of polyethylene oxide and polytetrahydrofuran, the polyether glycol having a number average molecular weight of 2,100 and containing 30% of ethylene oxide units, and 5.2 parts of terephthalic acid, to afford a polyether-ester-amide (X) having the following physical properties:

| | |
|---|---|
| ηr | 1.89. |
| Tm (°C.) | 237 |
| Shore D hardness | 35D |
| Tensile modulus (kg/cm²) | |
| −30° C. | 3,100 |

| | |
|---|---|
| 23° C. | 300 |
| 120° C. | 170 |
| Tensile strength (kg/cm$^2$) | |
| 23° C. | 250 |
| 120° C. | 140 |

EXAMPLE 11

Polymerization was conducted in the same way as in Example 6 using as starting materials 33.4 parts of undecamethylenediamine-cyclohexanedicarboxylate prepared in advance from undecamethylenediamine and cyclohexane-1,4-dicarboxylic acid, 58.3 parts of poly(tetramethylene oxide) glycol having a number average molecular weight of 650 and 15.3 parts of cyclohexane-1,4-dicarboxylic acid, to afford a polyether-ester-amide (XI) having the following physical properties:

| | |
|---|---|
| $\eta r$ | 1.80 |
| Tm (°C.) | 210 |
| Shore D hardness | 38D |
| Elastic recovery (%) | 81 |
| (at 50% elongation) | |
| Tensile modulus (kg/cm$^2$) | |
| −30° C. | 3,500 |
| 23° C. | 340 |
| 80° C. | 280 |
| 120° C. | 95 |
| Tensile strength (kg/cm$^2$) | |
| 23° C. | 270 |
| 80° C. | 160 |
| 120° C. | 70 |
| Elongation at break (%) | |
| 23° C. | 850 |
| 80° C. | 900 |
| 120° C. | 450 |

EXAMPLE 12

33.5 parts of hexamethylenediaminedodecanedioate (nylon 612 salt) prepared from hexamethylenediamine and dodecanedioic acid, 53.9 parts of poly(tetramethylene oxide) glycol having a number average molecular weight of 650 and 19.1 parts of dodecanedioic acid were charged, together with 0.20 part of N,N'-hexamethylene-bis(3,5-di-t-butyl-4-hydroxyhydrocinnamide)(antioxidant; trade name "Irganox" 1098) and 0.05 part of a tetrabutyl titanate catalyst, into a reaction vessel equipped with a helical ribbon agitation blade, followed by heating with stirring at 230° C. for 1 hour under a nitrogen gas atmosphere to give a homogeneous solution. Thereafter, polymerization conditions of 270° C. and 0.5 mmHg were created according to a heat-up and pressure-reducing program, under which conditions a polymerization reaction was allowed to take place for 4 hours and 10 minutes to obtain a colorless, transparent, viscous, molten polymer. The polymer was discharged in the form of strand into water to afford a flexible, non-sticky strand. The $\eta r$ and Tm of the polyether-ester-amide (XII) thus obtained were 1.82° and 193° C., respectively.

A compression-molded article from the polymer proved to have such mechanical properties as shown in Table 4. It was flexible and had rubber elasticity and exhibited a superior mechanical strength even at high temperature.

COMPARATIVE EXAMPLE 3

Using as starting materials 38.2 parts of aminododecanoic acid, 50.1 parts of poly(tetramethylene oxide) glycol and 17.7 parts of dodecanedioic acid, there was prepared a polyether-ester-amide (XII') under the same polymerization conditions as in Example 12. The $\eta r$ and Tm of this polyether-ester-amide were 1.80° and 139° C., respectively. As shown in Table 4, this product was superior in mechanical properties in the temperature region from low to normal temperature like the product of the invention prepared in Example 12, but at higher temperatures its tensile modulus and strength deteriorated to a large extent, and at 120° C. it almost flowed.

COMPARATIVE EXAMPLE 4

34.8 parts of hexamethylenediamine-adipate (nylon 66 salt), 59.9 parts of poly(tetramethylene oxide) glycol having a number average molecular weight of 650 and 13.5 parts of adipic acid were polymerized in the same manner as in Example 12. As a result, there occurred a gross phase separation and a brownishly turbid polymer resulted, whose polymerization degree, elastic recovery and strength were all low.

TABLE 4

| | | | Measured Value | |
|---|---|---|---|---|
| Item of Measurement | Measuring Method | Unit | Example 12 | Comparative Example 3 |
| 23° C. | | | | |
| Shore D hardness | ASTM D-2240 | Shore D | 38 | 38 |
| Tensile modulus | ASTM D-638 | kg/cm$^2$ | 540 | 460 |
| 10% modulus | " | " | 40 | 34 |
| Tensile strength | " | " | 300 | 320 |
| Elongation at break | " | % | 850 | 900 |
| Elastic recovery | JIS K-6301 | " | 80 | 78 |
| −30° C. | | | | |
| Tensile modulus | ASTM D-638 | kg/cm$^2$ | 2,900 | 3,300 |
| 10% modulus | " | " | 240 | 270 |
| 80° C. | | | | |
| Tensile modulus | ASTM D-638 | kg/cm$^2$ | 330 | 130 |
| Tensile strength | " | " | 160 | 55 |
| Elongation at break | " | % | 700 | 700 |
| 120° C. | | | | |
| Tensile modulus | ASTM D-638 | kg/cm$^2$ | 92 | Unmeasurable (flowed) |
| Tensile strength | " | " | 81 | Unmeasurable (flowed) |
| Elongation at break | " | % | 850 | Unmeasurable (flowed) |

EXAMPLES 13–15

Using as starting materials nylon 6.12 salt, poly(tetramethylene oxide) glycol (PTMG-650) having a number average molecular weight of 650 and terephthalic acid, there were prepared three kinds of polyether-ester-amide block copolymers (XIII), (XIV) and (XV) under the same polymerization conditions as in Example 12. Table 5 shows physical properties of these polymers.

TABLE 5

|  | Example 13 (XIII) | Example 14 (XIV) | Example 15 (XV) |
|---|---|---|---|
| Starting Materials (parts by weight) |  |  |  |
| Nylon 6.12 salt | 27.9 | 33.5 | 41.3 |
| PTMG-650 | 62.5 | 58.3 | 52.5 |
| Terephthalic acid | 16.0 | 14.9 | 13.4 |
| Polymer Characteristics |  |  |  |
| $\eta r$ | 1.87 | 1.84 | 1.78 |
| Tm (°C.) | 192 | 199 | 202 |
| Shore D hardness |  |  |  |
| 23° C. | 31 | 38 | 43 |
| Tensile modulus (kg/cm$^2$) |  |  |  |
| 23° C. | 410 | 520 | 900 |
| 80° C. | 300 | 350 | 550 |
| 120° C. | 86 | 120 | 360 |
| Tensile strength (kg/cm$^2$) |  |  |  |
| 23° C. | 280 | 330 | 410 |
| 80° C. | 130 | 160 | 250 |
| 120° C. | 97 | 110 | 160 |
| Elongation at break (%) |  |  |  |
| 23° C. | 1,200 | 850 | 750 |
| 80° C. | 1,150 | 850 | 850 |
| 120° C. | 750 | 900 | 1,000 |
| Elastic recovery (%) |  |  |  |
| 23° C. | 85 | 82 | 75 |

EXAMPLE 16

A polyether-ester-amide (XVI) was prepared under the same polymerization conditions as in Example 12 except that there were used 27.9 parts of nylon 6.12 salt, 66.4 parts of poly(tetramethylene oxide) glycol having a number average molecular weight of 1,000 and 11.1 parts of terephthalic acid. In the polymerization time of 3 hours and 55 minutes there was attained a high degree of polymerization reaching a predetermined torque, and a polymer of a light white color was obtained. This polymer, having a hard/soft segment ratio of 25/75, proved to have the following physical properties:

$\eta r$: 1.90
Tm: 198° C.
Mechanical Properties:
23° C. Shore D hardness: 30 D
Tensile modulus: 350 kg/cm$^2$
Tensile strength: 320 kg/cm$^2$
Elongation at break: 1,050%
Elastic recovery: 88%
88° C. Tensile modulus: 280 kg/cm$^2$
Tensile strength: 170 kg/cm$^2$
Elongation at break: 950%
120° C. Tensile modulus: 110 kg/cm$^2$
Tensile strength: 120 kg/cm$^2$
Elongation at break: 950%

COMPARATIVE EXAMPLE 5

Polymerization was conducted so as to give a hard-/soft segment ratio of 60/40 in Example 16. The resultant polymer was turbit in milky white and formed a gross phase separation. The polymer when discharged from the polymerization vessel exhibited a great Barus effect and it was impossible to take up the polymer as strand. The melting point of the polymer thus obtained was 205° C. But the elastic recovery was only 57% and the tensile strength at 120° C. was quite low.

COMPARATIVE EXAMPLE 6

Using as starting materials 27.9 parts of nylon 6.12 salt, 71.1 parts of poly(tetramethylene oxide) glycol and 4.7 parts of dodecanedioic acid, the preparation of a polyether-ester-amide having the same hard/soft ratio as that in Example 16 was tried, but the resultant polymer presented a pearl-like milky white color and formed a gross phase separation. This polymer, which was difficult to take up as strand, was pelletized and measured for physical properties as a pressed sheet; as a result, at 23° C. it exhibited a tensile strength of 130 kg/cm$^2$ and a elongation at break of 340%, but at 80° C. it scarcely exhibited strength.

EXAMPLE 17

27.9 parts of nylon 6.12 salt and 11.1 parts of terephthalic acid were charged into a polymerization vessel and heated with stirring at 230°–250° C. for 2 hours under a nitrogen gas stream, then 66.4 parts of poly(tetramethylene oxide) glycol having a number average molecular weight of 1,000, 0.05 part of tetrabutyl titanate and 0.20 part of "Irganox" 1098 were added into the reaction mixture, and subsequently there were created the same polymerization conditions as in Example 12. As a result, after 5 hours and 30 minutes, a predetermined torque was reached. Physical properties of this polymer are set out in Table 6.

COMPARATIVE EXAMPLE 7

27.9 parts of nylon 6.12 salt, 9.9 parts of adipic acid and 67.6 parts of poly(tetramethylene oxide) glycol having a number average molecular weight of 1,000 were used as starting materials in Example 17. Even after the lapse of 8 hours of polymerization, a predetermined torque was not reached and the polymer became brownish, so taken out and evaluated. This polymer, whose physical properties are shown in Table 6, proved to be low in melting point and inferior in high-temperature characteristics.

TABLE 6

|  | Example 17 | Comparative Example 7 |
|---|---|---|
| $\eta r$ | 1.89 | 1.77 |
| Tm (°C.) | 200 | 145 |
| Mechanical Properties: |  |  |
| 23° C. |  |  |
| Shore D hardness | 30 | 29 |
| Tensile modulus (kg/cm$^2$) | 330 | 310 |
| Tensile strength (kg/cm$^2$) | 290 | 200 |
| Elongation at break (%) | 950 | 650 |
| Elastic recovery (%) | 83 | 78 |
| 80° C. |  |  |
| Tensile modulus (kg/cm$^2$) | 260 | 130 |
| Tensile strength (kg/cm$^2$) | 150 | 72 |
| Elongation at break (%) | 950 | 700 |
| 120° C. |  |  |
| Tensile modulus (kg/cm$^2$) | 105 | Unmeasurable (flowed) |
| Tensile strength (kg/cm$^2$) | 95 | Unmeasurable (flowed) |
| Elongation at break (%) | 700 | Unmeasurable (flowed) |

EXAMPLE 18

A polyether-ester-amide was prepared under the same polymerization conditions as in Example 12 except that 28.2 parts of nylon 6.12 salt, 62.5 parts of poly(tetramethylene oxide) glycol having a number average molecular weight of 650 and 16.0 parts of terephthalic acid were used as starting materials. The polymer proved to have the following physical properties:

$\eta r$: 1.86
Tm (°C.): 208

Mechanical Properties:
23° C. Shore D hardness: 34
Tensile modulus (kg/cm$^2$): 380
Tensile strength (kg/cm$^2$): 240
Elongation at break (%): 700
Elastic Recovery (%): 76
80° C. Tensile modulus (kg/cm$^2$): 280
Tensile strength (kg/cm$^2$): 130
Elongation at break (%): 850
120° C. Tensile modulus (kg/cm$^2$): 120
Tensile strength (kg/cm$^2$): 75
Elongation at break (%): 550

EXAMPLE 19

39.3 parts of undecamethylenediamine-adipate (nylon 11.6 salt) prepared in advance from undecamethylenediamine and adipic acid, 54.2 parts of poly(tetramethylene oxide) glycol having a number average molecular weight of 650 and 13.8 parts of terephthalic acid were charged, together with 0.20 part of N,N'-hexamethylene-bis(3,5-di-t-butyl-4-hydroxyhydrocinnamide)(antioxidant; trade name "Irganox" 1098) and 0.05 part of a tetrabutyl titanate catalyst, into a reaction vessel equipped with a helical ribbon agitation blade, and heated with stirring at 230° C. for 1 hour under a nitrogen gas stream to give a homogeneous solution. Subsequently, there were created polymerization conditions of 280° C. and 0.5 mmHg according to a heat-up and pressure-reducing program, under which conditions a polymerization reaction was allowed to take place for 2 hours to afford a colorless, transparent, viscous, molten polymer. The polymer was discharged in the form of strand into water from the lower portion of the polymerization vessel; as a result, it whitened and became a flexible, non-sticky strand. The r and Tm of the polyether-ester-amide (XII) thus obtained were 1.75° and 204° C., respectively.

A press-molded article from the polymer proved to have such mechanical properties as shown in Table 7. It was flexible and had rubber elasticity and exhibited a superior mechanical strength even at high temperatures.

COMPARATIVE EXAMPLES 8-12

For comparison with Example 19 in which the polyether-ester-amide contained 35 wt.% of nylon 11.6 as hard segment, there were prepared five kinds of polymers respectively containing as hard segment nylon 12, nylon 66, nylon 6, nylon 12.12 and nylon 11.12 and having the same composition and content of soft segment, under the same conditions. As to nylon 12 and nylon 6, the respective corresponding aminocarboxylic acids were used, while the others were used as nylon salts. The state of polymerization and physical properties of the polymers are shown in Table 7.

TABLE 7

| Hard Segment | Present Invention Example 19 N-11.6 | Comparative Example | | | | |
|---|---|---|---|---|---|---|
| | | Comp. Ex. 8 N-12 | Comp. Ex. 9 N-6.6 | Comp. Ex. 10 N-6 | Comp. Ex. 11 N-12.12 | Comp. Ex. 12 N-11.12 |
| Polymerization | | | | | | |
| Appearance of molten polymer | Colorless, transparent | Colorless, transparent | Milky, phase separation | Translucent | Colorless, transparent | Colorless, transparent |
| Polymerization time (hr:min) | 2:00 | 3:30 | 8:00 Target torque not reached | 4:50 Large amount of lactam distilled out of system | 4:30 | 2:20 |
| Polymer Characteristics | | | | | | |
| r | 1.75 | 1.76 | 1.52 | 1.77 | 1.76 | 1.75 |
| Tm (°C.) | 204 | 135 | 230 | 185 | 140 | 135 |
| Crystallinity | Large | Small | Large | Medium | Small | Small |
| Mechanical Properties ASTM | | | | | | |
| 23° C. | | | | | | |
| Shore D hardness D-2240 | 36 | 36 | 45 | 35 | 36 | 35 |
| Tensile modulus D-638 (kg/cm$^2$) | 450 | | 1,050 | 410 | 430 | 410 |
| 10% modulus D-638 (kg/cm$^2$) | 34 | 32 | 84 | 31 | 32 | 32 |
| Tensile strength D-638 (kg/cm$^2$) | 350 | 320 | 130 | 330 | 300 | 280 |
| Elongation at break D-638 (%) | 950 | 850 | 250 | 900 | 750 | 900 |
| Elastic recovery JIS K-6301 (%) (at 50% elongation) | 83 | 79 | 43 | 75 | 78 | 74 |
| −30° C. | | | | | | |
| Tensile modulus (kg/cm$^2$) | 2,800 | 3,100 | 4,200 | 3,800 | 3,000 | 2,900 |
| 10% modulus (kg/cm$^2$) | 250 | 260 | 320 | 300 | 260 | 270 |
| 80° C. | | | | | | |
| Tensile modulus (kg/cm$^2$) | 350 | 130 | 250 | 310 | 150 | 120 |
| Tensile strength (kg/cm$^2$) | 180 | 60 | 53 | 140 | 74 | 66 |
| Elongation at break (%) | 700 | 700 | 120 | 600 | 700 | 650 |

TABLE 7-continued

| Hard Segment | Present Invention Example 19 N-11.6 | Comparative Example Comp. Ex. 8 N-12 | Comp. Ex. 9 N-6.6 | Comp. Ex. 10 N-6 | Comp. Ex. 11 N-12.12 | Comp. Ex. 12 N-11.12 |
|---|---|---|---|---|---|---|
| 120° C. | | | | | | |
| Tensile modulus (kg/cm²) | 170 | Unmeasurable (flowed) | Unmeasurable (flowed) | 96 | Unmeasurable (flowed) | Unmeasurable (flowed) |
| Tensile strength (kg/cm²) | 110 | Unmeasurable (flowed) | Unmeasurable (flowed) | 10 | Unmeasurable (flowed) | Unmeasurable (flowed) |
| 120° C. | | | | | | |
| Elongation at break (%) | 1,000 | Unmeasurable (flowed) | Unmeasurable (flowed) | 130 | Unmeasurable (flowed) | Unmeasurable (flowed) |
| 150° C. | | | | | | |
| Tensile modulus (kg/cm²) | 65 | Unmeasurable | Unmeasurable | Unmeasurable | Unmeasurable | Unmeasurable |
| Tensile strength (kg/cm²) | 51 | Unmeasurable | Unmeasurable | Unmeasurable | Unmeasurable | Unmeasurable |
| Elongation at break (%) | 850 | Unmeasurable | Unmeasurable | Unmeasurable | Unmeasurable | Unmeasurable |

EXAMPLES 20 AND 21

Polymerization was conducted in just the same manner as in Example 21 except that the copolymerization ratio of nylon 11.6 salt, poly(tetramethylene oxide) glycol (PTMG-650) having a number average molecular weight of 650 and terephthalic acid was changed so as to give hard/soft ratios of 30/70 and 40/60. Physical properties of the polymers thereby obtained are shown in Table 8 below.

TABLE 8

| | Example 20 | Example 21 |
|---|---|---|
| Hard/Soft weight ratio | 30/70 | 40/60 |
| Polymerization Time (hr:min) | 2:20 | 1:30 |
| Polymerization Temperature (°C.) | 275 | 280 |
| ηr | 1.79 | 1.76 |
| Tm (°C.) | 200 | 209 |
| Tc (°C.) | 156 | 167 |
| Shore D hardness | 31 | 38 |
| Tensile modulus (kg/cm²) | | |
| 23° C. | 340 | 610 |
| 80° C. | 290 | 420 |
| 120° C. | 105 | 240 |
| 150° C. | 30 | 95 |
| Tensile strength (kg/cm²) | | |
| 23° C. | 320 | 430 |
| 80° C. | 160 | 220 |
| 120° C. | 81 | 135 |
| 150° C. | 22 | 84 |
| Elongation at break (%) | | |
| 23° C. | 950 | 800 |
| 80° C. | 750 | 950 |
| 120° C. | 750 | 900 |
| 150° C. | 350 | 900 |
| Elastic recovery (%) | | |
| 23° C. | 85 | 78 |

EXAMPLES 22 AND 23

Using as starting materials nylon 11.6 salt, poly(tetramethylene oxide) glycols respectively having number average molecular weights of 800 and 1,000 and terephthalic acid, there were prepared polyether-ester-amide block copolymers (XXII) and (XXIII) having a hard/soft ratio of 30/70, physical properties of which are as shown in Table 9 below.

TABLE 9

| | Example 22 | Example 23 |
|---|---|---|
| Polymer Composition | | |
| PTMG Mn | 800 | 1,000 |
| Hard/Soft ratio | 30/70 | 30/70 |
| Polymerization | | |
| Appearance of molten polymer | Colorless, transparent | Colorless, transparent |
| Polymerization time (hr:min) | 2:20 | 2:15 |
| Physical Properties | | |
| ηr | 1.84 | 1.88 |
| Tm (°C.) | 202 | 206 |
| Tc (°C.) | 158 | 163 |
| Shore D hardness | 30 | 30 |
| Tensile modulus (kg/cm²) | 320 | 300 |
| Tensile strength (kg/cm²) | 330 | 300 |
| Elongation at break (%) | 1,100 | 950 |
| Elastic recovery (%) | 87 | 84 |
| High-Temperature Characteristics (120° C.) | | |
| Tensile modulus (kg/cm²) | 110 | 130 |
| Tensile strength (kg/cm²) | 110 | 95 |
| Elongation at break (%) | 900 | 750 |

EXAMPLE 24

A polymerization reaction was carried out under the same conditions as in Example 19 except that 44.9 parts of nylon 11.6 salt, 51.3 parts of poly(tetramethylene oxide) glycol having a number average molecular weight of 650 and 12.1 parts of adipic acid were used as starting materials. The polymer thereby obtained, corresponding to the polymer of Example 21 except change of the dicarboxylic acid component from terephthalic acid to adipic acid, proved to hve such physical properties as shown in Table 10 below.

TABLE 10

| | |
|---|---|
| ηr | 1.77 |
| Tm (°C.) | 201 |
| Tc (°C.) | 162 |
| Shore D hardness | |
| 23° C. | 38 |
| Tensile modulus (kg/cm²) | |
| 23° C. | 620 |
| 80° C. | 420 |
| 120° C. | 220 |

TABLE 10-continued

| | |
|---|---|
| 150° C. | 75 |
| Tensile strength (kg/cm$^2$) | |
| 23° C. | 390 |
| 80° C. | 180 |
| 120° C. | 94 |
| 150° C. | 15 |
| Elongation at break (%) | |
| 23° C. | 750 |
| 80° C. | 900 |
| 120° C. | 850 |
| 150° C. | 120 |
| Elastic recovery (%) | |
| 23° C. | 76 |

COMPARATIVE EXAMPLE 13

There was tried preparation of a polyether-ester-amide having the same hard/soft ratio as that in Example 24 except that the poly(tetramethylene oxide) glycol used was of a number average molecular weight of 3,500. But the polymer thereby prepared presented a pearl-like milky white color and formed a gross phase separation.

Its tensile strength and elongation at break at 23° C. were 240 kg/cm$^2$ and 300%, respectively, and thus somewhat low. Al 120° C. they were 18 kg/cm$^2$ and 70%, respectively, and thus too low to stand use.

EXAMPLE 25

A polyether-ester-amide (XXV) was prepared under the same polymerization conditions as in Example 19 except that 33.6 parts of nylon 11.6 salt, 65.7 parts of polypropylene glycol containing a total of 20% of ethylene oxide blocks at both ends thereof and having a number average molecular weight of 2,000 and 5.5 parts of terephthalic acid were used as starting materials. The polymer (XXV) proved to have the following physical properties:

$\eta r$: 1.87
Tm: 210° C.
Shore D hardness: 29 D
Tensile modulus: 280 kg/cm$^2$
Elastic recovery: 84%

What is claimed is:

1. A polyether-ester-amide consisting essentially of about 5 to 50 weight percent of polyamide segment (A) and about 95 to 50 weight percent of polyether ester segment (B), and having a melting point not lower than 160° C., a Shore hardness in the range of 80A to 45D, a tensile modulus in the range of 100 to 1,000 kg/cm$^2$ and an elastic recovery at 50% elongation of not less than 70%,
said polyamide segment (A) having been obtained from:
a C$_6$–C$_{20}$ aliphatic diamine (A-1): and
at least one dicarboxylic acid (A-2) selected from the group consisting of C$_6$–C$_{15}$ aliphatic dicarboxylic acids, terephthalic acid and hexahydroterephthalic acid, provided the total number of carbon atoms of said diamine and said dicarboxylic acid is not less than 16,
said polyether ester segment (B) having been obtained from:
a poly(alkylene oxide) glycol (B-1) having a ratio of carbon atom number to oxygen atom number of not smaller than 2.3 and having a number average molecular weight in the range of 300 to 5,000; and
a C$_4$–C$_{20}$ dicarboxylic acid (B-2).

2. The polyether-ester-amide of claim 1, wherein said polyamide segment (A) has been obtained from a C$_6$–C$_{20}$ aliphatic diamine (A-1) and at least one C$_6$–C$_{15}$ aliphatic dicarboxylic acid (A-2), the total number of carbon atoms of said diamine and said dicarboxylic acid being not less than 16.

3. The polyether-ester-amide of claim 1, wherein said aliphatic diamine (A-1) of said polyamide segment (A) is hexamethylenediamine, and said aliphatic dicarboxylic acid is at least one member selected from sebacic acid and dodecanedioic acid.

4. The polyether-ester-amide of claim 1, wherein said aliphatic diamine (A-1) of said polyamide segment (A) is at least one member selected from undecamethylenediamine and dodecamethylenediamine.

5. The polyether-ester-amide of claim 1, wherein said polyamide segment (A) has been obtained from an equimolar amount of at least one diamine (A-1) selected from undecamethylenediamine and dodecamethylenediamine and at least one dicarboxylic acid (A-2) selected from terephthalic acid and hexahydroterephthalic acid, or obtained from a salt of said diamine (A-1) with said dicarboxylic acid (A-2).

6. The polyether-ester-amide of claim 1, wherein said aliphatic diamine (A-1) of said polyamide segment (A) is at least one member selected from undecamethylenediamine and dodecamethylenediamine, and said dicarboxylic acid (A-2) is at least one C$_6$–C$_{10}$ aliphatic dicarboxylic acid.

7. The polyether-ester-amide of claim 1, wherein the dicarboxylic acid (B-2) as a constituent of said polyether ester segment (B) is the same dicarboxylic acid as the dicarboxylic acid (A-2) as a constituent of said polyamide segment (A), or alternatively it is terephthalic acid.

8. The polyether-ester-amide of claim 1, wherein the dicarboxylic acid (B-2) as a constituent of said polyether ester segment (B) is the same dicarboxylic acid as the dicarboxylic acid (A-2) as a constituent of said polyamide segment (A).

9. The polyether-ester-amide of claim 1, wherein the dicarboxylic acid (B-2) as a constituent of said polyether ester segment (B) is terephthalic acid.

10. The polyether-ester-amide of claim 1, wherein the number average molecular weight of said poly(alkylene oxide) glycol is in the range of 500 to 3,000.

11. The polyether-ester-amide of claim 1, wherein said poly(alkylene oxide) glycol is poly(tetramethylene oxide) glycol having a number average molecular weight in the range of 500 to 2,500.

12. The polyether-ester-amide of claim 1 consisting essentially of about 10 to 50 weight percent of said polyamide segment (A) and about 90 to 50 weight percent of said polyether ester segment (B) both linked together.

13. The polyether-ester-amide of claim 1 consisting essentially of about 20 to 45 weight percent of said polyamide segment (A) and about 80 to 55 weight percent of said polyester segment (B) both linked together.

14. A process for preparing a polyether-ester-amide consisting essentially of about 5 to 50 weight percent of polyamide segment (A) and about 95 to 50 weight percent of polyether ester segment (B), which process comprises the steps of:
charging into a vessel capable of being heated both a substantially equimolar amount of at least one C$_6$–C$_{20}$ aliphatic diamine (A-1) and at least one dicarboxylic acid (A-2) selected from the group consisting of $C_6$-$C_{15}$ aliphatic dicarboxylic acids, terephthalic acid and hexahydroterephthalic acid, or a salt formed from said aliphatic diamine (A-1) and said dicarboxylic acid (A-2), and a substantially equimolar amount of a poly(alkylene oxide) glycol (B-1) and at least one $C_4$-$C_{20}$ dicarboxylic acid (B-2), said poly(alkylene oxide) glycol (B-1) having a ratio of carbon atom number to oxygen atom number of not less than 2.3 and having a number average molecular weight in the range of 300 to 5,000, followed by heating for homogenization at a temperature in the range of 150° to 260° C. under stirring; and heating the homogenized reaction mixture at a temperature in the range of 220° to 300° C. under a high vacuum not greater than 15 mmHg for polycondensation into said polyether-ester-amide.

15. The process of claim 14, wherein said dicarboxylic acid (A-2) is a $C_6$-$C_{15}$ aliphatic dicarboxylic acid.

16. The process of claim 14, wherein said diamine (A-1) is hexamethylenediamine, and said dicarboxylic acid (A-2) is at least one member selected from sebacic acid and dodecanedioic acid.

17. The process of claim 14, wherein said diamine (A-1) is at least one member selected from undecamethylenediamine and dodecamethylenediamine.

18. The process of claim 14, wherein said diamine (A-1) is at least one member selected from undecamethylenediamine and dodecamethylenediamine, and said dicarboxylic acid (A-2) is at least one member selected from terephthalic acid and hexahydroterephthalic acid.

19. The process of claim 14, wherein said diamine (A-1) is at least one member selected from undecamethylenediamine and dodecamethylenediamine, and said dicarboxylic acid (A-2) is at least one $C_6$-$C_{10}$ aliphatic dicarboxylic acid.

20. The process of claim 14, wherein said dicarboxylic acid (B-2) is the same dicarboxylic acid as said dicarboxylic acid (A-2), or alternatively it is terephthalic acid.

* * * * *